United States Patent
Walter et al.

(10) Patent No.: US 10,670,164 B2
(45) Date of Patent: Jun. 2, 2020

(54) MODULAR (GLUE-) VALVE

(71) Applicant: Focke & Co. (GmbH & Co. KG), Verden (DE)

(72) Inventors: Jan-Christian Walter, Hamburg (DE); Stephan Vollmer, Buchholz (DE)

(73) Assignee: Focke & Co. (GmbH & Co. KG), Verden (DE)

(*) Notice: Subject to any disclaimer, the term of this patent is extended or adjusted under 35 U.S.C. 154(b) by 0 days.

(21) Appl. No.: 15/610,710

(22) Filed: Jun. 1, 2017

(65) Prior Publication Data
US 2017/0350526 A1    Dec. 7, 2017

(30) Foreign Application Priority Data

Jun. 6, 2016  (DE) .................... 10 2016 006 786

(51) Int. Cl.
*F16K 31/06*        (2006.01)
*B05C 5/02*         (2006.01)
(Continued)

(52) U.S. Cl.
CPC ........ *F16K 31/0665* (2013.01); *B05C 5/0225* (2013.01); *F16K 1/14* (2013.01);
(Continued)

(58) Field of Classification Search
CPC ............. F16K 31/0665; F16K 31/0662; F16K 31/0675; F16K 1/14; F16K 27/029; B05C 5/0225
See application file for complete search history.

(56) References Cited

U.S. PATENT DOCUMENTS 3,429,552 A * 2/1969 Erickson ............. F16K 31/0658
                                                      251/129.17
5,605,317 A * 2/1997 Mealy ................. F16K 31/0651
                                                      251/129.01
(Continued)

FOREIGN PATENT DOCUMENTS

CN    101631979 A    1/2010
CN    102369380 A    3/2012
(Continued)

OTHER PUBLICATIONS

Deutsches Patent—Und Markenamt (German Patent and Trademark Office), Recherchebericht (search in connection with priority application), Mar. 20, 2017.
(Continued)

*Primary Examiner* — Matthew W Jellett
(74) *Attorney, Agent, or Firm* — Laurence P. Colton; Smith Tempel Blaha LLC

(57) ABSTRACT

A modular valve for free-flowing media, with a main module with a valve housing and an electromagnet, a dosing module with a closure member which is movable by means of the electromagnet and which closes a dispensing opening of the dosing module, and a valve lift adjustment module for adjusting the valve lift, which valve lift adjustment module comprises an elongate abutment part which is arranged at least in part in a valve interior of the main module and is modifiable in its axial position in the valve interior, which abutment part limits the movement of the closure member in the direction of the valve lift adjustment module, the dosing module and the valve lift adjustment module being connected releasably to the main module in such a way that the dosing module and the valve lift adjustment module can each be replaced by another module of the same module type.

12 Claims, 5 Drawing Sheets

(51) Int. Cl.
*F16K 1/14* (2006.01)
*F16K 27/02* (2006.01)
(52) U.S. Cl.
CPC ........ *F16K 27/029* (2013.01); *F16K 31/0662* (2013.01); *F16K 31/0675* (2013.01)

(56) References Cited

U.S. PATENT DOCUMENTS

| | | | | |
|---|---|---|---|---|
| 5,875,922 | A * | 3/1999 | Chastine | B05C 5/02 222/1 |
| 6,318,599 | B2 * | 11/2001 | Estelle | B05C 5/001 222/146.5 |
| 8,151,824 | B2 | 4/2012 | Williams | |
| 2004/0074994 | A1 * | 4/2004 | Ganzer | B05C 5/0225 239/533.1 |
| 2006/0169936 | A1 * | 8/2006 | Nonaka | F16K 31/0655 251/129.02 |
| 2010/0133453 | A1 * | 6/2010 | Hoppe | B05C 5/0225 251/65 |
| 2012/0037823 | A1 | 2/2012 | Juergens | |
| 2012/0313019 | A1 * | 12/2012 | Neudeck | F16K 31/082 251/65 |

FOREIGN PATENT DOCUMENTS

| | | |
|---|---|---|
| CN | 102449359 A | 5/2012 |
| DE | 4013322 A1 | 10/1991 |
| DE | 3745068 C2 | 8/1995 |
| DE | 20218441 U1 | 2/2003 |
| DE | 102012016833 A1 | 5/2014 |
| DE | 102012023704 A1 | 6/2014 |
| DE | 102102023704 A1 | 6/2014 |
| DE | 102014001897 A1 | 8/2015 |
| GB | 2457220 A | 8/2009 |
| WO | 2014032761 A1 | 3/2014 |

OTHER PUBLICATIONS

European Patent Office, Europaischer Recherchenbericht (EPO search on a related application), dated Oct. 6, 2017.
European Patent Office, Mitteilung (action in a related application), dated Apr. 26, 2019.
China National Intellectual Property Administration, Notification of the First Office Action (on a related application), dated Jul. 26, 2019.

* cited by examiner

MODULAR (GLUE-) VALVE

STATEMENT OF RELATED APPLICATIONS

This patent application claims the benefit of and priority on German Patent Application No. 10 2016 006 786.1 having a filing date of 6 Jun. 2017.

BACKGROUND OF THE INVENTION

Technical Field

The invention relates to a modular valve for free-flowing media, in particular a glue valve. The invention further relates to a replacement dosing module and a replacement valve lift adjustment module for such a valve, and to a valve module set.

Prior Art

Various designs of (glue) valves are known. Among others, electromagnetically operated valves in which a closure member forming an armature of the electromagnet closes or frees a dispensing opening of the valve. Such valve are often designed in such a way that the closure member is loaded in the closed position of the valve by a permanent closing force, and an opening movement is effected by applying an oppositely directed magnetic force of the electromagnet.

Such valves can be differentiated by, among other things, the way in the the permanent closing force is applied. For example, it is known to apply this force by means of a spring, or by means of a permanent magnet comprising several individual magnets.

Valves of this kind can also be differentiated according to the nature and shape of the portions of medium that can be generated. Among others, valves are known that generate individual droplet-shaped portions of medium. By contrast, there are also valves with a wide and in particular slit-shaped dispensing opening for applying the free-flowing medium or the glue in a sheet-like or strip-like formation.

Depending on the intended purpose, a decision has to be made about which type of valve to use. This may have the disadvantage of necessitating a cost-intensive and complete replacement of the respective valve.

BRIEF SUMMARY OF THE INVENTION

Proceeding from this, the object of the present invention is to allow electromagnetically operated valves to be easily adapted to the particular intended purpose.

This object is achieved by a modular valve for free-flowing media, in particular a glue valve, with a main module with a valve housing and an electromagnet, with a dosing module with a closure member which is movable by means of the electromagnet and which closes a dispensing opening of the dosing module in a closed position of the modular valve, and with a valve lift adjustment module for adjusting the valve lift, which valve lift adjustment module comprises an elongate abutment part which is arranged at least in part in a valve interior of the main module and is modifiable in its axial position in the valve interior, which abutment part limits the movement of the closure member in the direction of the valve lift adjustment module, wherein the dosing module and the valve lift adjustment module are connected releasably to the main module, in particular by screwing, in such a way that the modules, in particular the dosing module and the valve lift adjustment module, can each be replaced by another module of the same module type, by a replacement dosing module for such a modular valve for free-flowing media according to the invention, characterized in that the replacement dosing module can be connected releasably to the main module of the modular valve after removal of the dosing module (to be replaced) of the modular valve, by a replacement valve lift adjustment module for such a modular valve for free-flowing media according to the invention, characterized in that the replacement valve lift adjustment module can be connected releasably to the main module of the modular valve after removal of the valve lift adjustment module (to be replaced) of the modular valve, and by a valve module set with a modular valve according to the invention, with a matching replacement dosing module according to the invention, and/or with a matching replacement valve lift adjustment module according to the invention.

A modular valve according to the invention for free-flowing media, in particular a glue valve, has a main module with a valve housing and an electromagnet, a dosing module with a closure member which is movable by means of the electromagnet and which closes a dispensing opening of the valve or of the dosing module in a closed position of the modular valve, and it has a valve lift adjustment module for adjusting the valve lift, which valve lift adjustment module comprises an elongate abutment part which is arranged at least in part in a valve interior of the main module and is modifiable in its axial position in the valve interior, which abutment part limits the movement of the closure member in the direction of the valve lift adjustment module, wherein the dosing module and the valve lift adjustment module are connected releasably to the main module, in particular by screwing, in such a way that the modules, in particular the dosing module and the valve lift adjustment module, can each be replaced by another module of the same module type.

This modularity according to the invention makes it easily possible, for example, to replace or exchange only (i.e. while retaining the main module) the dosing module (module type "Dosing module") or the valve lift adjustment module (module type "Valve lift adjustment module") of the valve when the intended purpose of the latter changes.

For example, in a case in which a valve is operated at particularly high frequencies, it would be possible to use a dosing module and a valve lift adjustment module in which the (permanent) closing force acting on the closure member is applied by a permanent magnet. This is because the use of a spring for applying said force could in this case lead to a very high degree of wear of the spring.

By contrast, in another case in which the free-flowing medium has a very high viscosity, a dosing module with a spring could be entirely appropriate, since a spring is especially suitable for applying high forces.

Naturally, the valve modularity according to the invention is also advantageous if one of the modules is faulty.

Theoretically, the relevant module of the module type "Main module" can also be replaced by another module of this module type, for example if the main module has a fault and, by contrast, one or both of the other modules is/are still functional.

According to a preferred development of the invention, the main module has, at one end, a receiver for the dosing module, and, at the opposite other end, it has a receiver for the valve lift adjustment module.

For this purpose, the valve housing of the main module can be open in the area of both receivers.

One or both receivers of the main module can each have a securing means which interacts with a matching securing means of the valve lift adjustment module or with a matching securing means of the dosing module and thereby effects/permits a releasable securing of the valve lift adjustment module on the main module and a releasable securing of the dosing module on the main module.

The receivers of the main module for the valve lift adjustment module and the dosing module, and also the valve interior of the valve housing in which the closure member is arranged movably, are preferably designed in such a way and oriented relative to one another in such a way that the abutment part of the valve lift adjustment module and the closure member of the dosing module are positioned centrally in the valve interior and in succession along a common (longitudinal centre) axis.

The main module can have a coil carrier which is preferably made in one piece and produced in particular from a metallic material, on which coil carrier the windings of a coil of the electromagnet are wound, and which coil carrier surrounds a coil carrier interior in which at least one portion of the closure member is arranged and at least one portion of the abutment part.

Moreover, in a particular embodiment of the invention, the dosing module and/or the valve lift adjustment module can be secured on the coil carrier of the main module.

In this case, the coil carrier can have a coil portion onto which the coil is wound, adjoining the coil portion on one side a head portion with a (terminal) receiver for the valve lift adjustment module, to which receiver the valve lift adjustment module is releasably connected, in particular by screwing, and, adjoining it on the opposite side, a foot portion with a (terminal) receiver for the dosing module, to which receiver the dosing module is releasably connected, in particular by screwing.

The (terminal) receiver for the valve lift adjustment module can be formed by an end portion of the coil carrier interior surrounded by the head portion, and by a wall of the head portion surrounding this end portion, and the (terminal) receiver for the dosing module can be formed by an end portion of the coil carrier interior surrounded by the foot portion, and by a wall of the foot portion surrounding this end portion.

Independent subject matter of the invention is accordingly also a replacement dosing module for the above modular valve, which replacement dosing module can be connected releasably to the main module of the modular valve after removal of the dosing module of the modular valve, and also a replacement valve lift adjustment module which can be connected releasably to the main module of the modular valve after corresponding removal of the valve lift adjustment module of the valve.

For this purpose, the respective replacement module would preferably accordingly have a securing means which can interact with a matching securing means of the main module of the modular valve and would thus effect or permit a releasable securing of the replacement dosing module on the main module.

In a preferred development of this concept, a particular replacement dosing module is provided for the case where the above modular valve for free-flowing media has a dosing module (to be replaced) whose closure member, as has already been indicated above, is held in the closed position by a permanent closing force applied by a permanent magnet which comprises an individual magnet arranged on the abutment part and an individual magnet arranged on the closure member, wherein the individual magnets are positioned in such a way that identical poles face each other in order to apply the closing force. For this case, if required for the intended purpose or if so desired, a replacement dosing module can be provided which, like the dosing module to be replaced, likewise has a closure member which is movable by the electromagnet of the modular valve and which can close a dispensing opening of the replacement dosing module in a closed position of the modular valve, but which instead of the permanent magnet has in particular a spring for applying the permanent closing force to the closure member.

Particularly in this case, it is expedient also to replace the valve lift adjustment module of the modular valve, in so far as its abutment part correspondingly has at least one individual magnet which is part of a/the permanent magnet. In this case, the replacement valve lift adjustment module would, like the valve lift adjustment module to be replaced, likewise comprise an elongate abutment part which is arranged at least in part in the valve interior of the main module and which is modifiable in its axial positon in the valve interior, which abutment part can limit the movement of the closure member in the direction of the valve lift adjustment module. However, the abutment part of the replacement module would have no individual magnet, since the latter is no longer necessary.

Moreover, it is also conceivable that the dosing module of the modular valve has a different nozzle than the replacement dosing module. Thus, the dosing module of the modular valve can have a nozzle with which individual droplet-shaped portions of medium can be generated, and the replacement dosing module can have a nozzle with which linear or sheet-like portions of medium can be generated (wide-slit nozzle).

BRIEF DESCRIPTION OF THE DRAWINGS

Further features of the present invention will become clear from the accompanying patent claims, from the following description of preferred illustrative embodiments of the invention and from the accompanying drawings, in which:

DETAILED DESCRIPTION OF PREFERRED EMBODIMENTS

Various aspects of (electro)valves 14 according to the invention and in particular of their modularity are explained in detail below.

In the present illustrative embodiments, these (modular) valves 14 are part of a valve arrangement 10 with a plurality of individual valves 14. It will be appreciated, however, that the invention can also include individual valves or individually operated valves outside such an arrangement 10.

Figure 1:
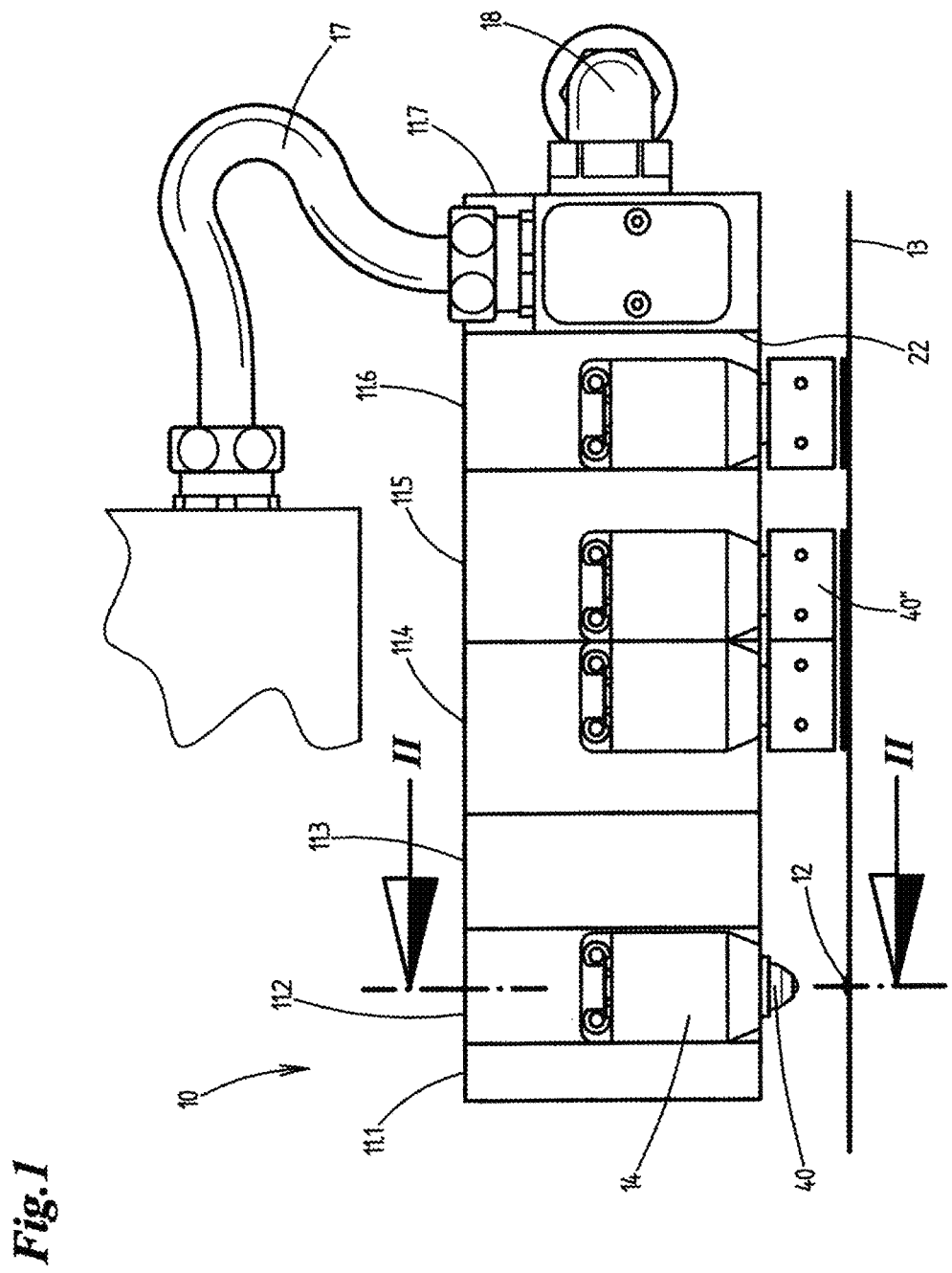
FIG. 1 shows a plan view of a valve arrangement composed of a plurality of modular individual valves according to the invention.

The valve arrangement 10 or installation shown in FIG. 1, for discharging free-flowing media onto surfaces, is constructed from several individual modules 11.1-11.7. To simplify matters, all of these individual modules are designated 11.1-11.7 in the context of the application. A similar valve arrangement is also disclosed in DE 10 2014 001 897 A1, of which the content is herewith incorporated.

In the illustrative embodiment shown, the valve arrangement 10 serves to apply glue, in particular hot glue, (in several bands) onto surfaces of blanks or material webs of paper, film or the like used in the production of cigarette packs. However, it is of course also within the context of the invention to use the valve arrangement 10 to apply other fluid or free-flowing media, for example paints, lacquers or the like, to the surfaces of items of another kind.

With the valves 14 of the valve arrangement 10, individual (small) portions of medium or glue portions 12 are respectively applied, for example, to a blank 13. In the present case, the individual modules 11.1-11.7 are arranged in succession in the longitudinal extent of the valve arrangement 10 in a common row. Respective pairs of two adjacent individual modules 11.1-11.7 are connected releasably to each other. In the present case, by means of screws arranged in (continuous) screw holes 63.

Certain individual modules, namely the individual modules 11.2, 11.4-11.6, each have a valve or a valve unit 14, each of these with a (lower) dispensing or dosing opening 15. The free-flowing medium in the process is applied to the surface of the blank 12 via these individual modules 11.2, 11.4-11.6 with their respective valve unit 14, i.e. via the respective dosing opening 15.

The individual module 11.7 serves to attach the valve arrangement 10 to power supply lines coming in particular from the higher-order (packaging) machine, in particular from the machine control, and if appropriate additional control lines 16. In the present case, the lines 16 are routed in the interior of a cable tube 17. Starting from the module 11.7, the lines 16 are routed through the valve arrangement 10 to the individual modules 11.2, 11.4-11.6 with valve unit 14.

The module 11.7 moreover serves to attach the valve arrangement 10 to a source of medium, for example a tank containing hot glue. For this purpose, a corresponding medium tube 18, in this case heated, ends on the individual module 11.7. From the individual module 11.7, the medium routed through the tube 18 is distributed inside the valve arrangement 10 and routed to the individual modules 11.2, 11.4-11.6 with valve unit 14. The individual module 11.7 also serves for attachment to preferred control lines (not shown) likewise coming from the source of medium, or from a control appliance thereof. These control lines are also routed to the individual modules 11.2, 11.4-11.6 with valve unit 14.

The modules 11.1, 11.3 are intermediate modules with which in particular the overall width of the valve arrangement 10 can be influenced. In addition, provision can be made that the valve units 14, as can be seen in FIG. 1, are arranged at an angle to one another and in particular have lateral bevels on the respective housing in order to reduce the track spacing between adjacent valve units 14.

Each individual module 11.1-11.7 has a main body 19. The individual main bodies 19 each have, on at least one (outer) face, a flange surface on which there bears a corresponding flange surface of the main body 19 of a or the individual module 11.1-11.7 that is adjacent thereto in the common row. With the exception of the end module 11.1, all of the other main bodies 19 of the individual modules 11.2-11.7 each have a main duct 20 for medium, which main duct 20 in the present case preferably runs parallel to the longitudinal extent of the valve arrangement 10. In any case, the main ducts 20 for medium of the individual modules 11.1-11.7, in which other individual modules in the row of individual modules 11.1-11.7 adjoin on two sides, extend continuously from the (outer) face with flange surface to the other (outer) face with flange surface. The individual main ducts 20 for medium of the main bodies 19 of the individual modules 11.2-11.7 abut each other, in particular in a flush arrangement, resulting overall in a continuous duct which extends from the main body 19 of the module 11.2 to the main body 19 of the module 11.7.

Moreover, the main bodies 19 of the individual modules 11.2, 11.4-11.6 with valve or valve unit 14 each have a medium branch duct 21 issuing from the respective main duct 20. The branch ducts 21 are each routed as far as a securing (outer) face 22 of the respective main body 19. The respective valve unit 14 is secured (releasably) on each securing face 22. Besides the main duct 20 for medium, the main bodies 19 of the individual modules 11.2-11.7 additionally each have at least one cable duct 23 extending preferably parallel to the respective main duct 20 for medium.

On the one hand, the power lines and optionally the control lines 16 for the valve units 14 are routed through the cable duct 23, wherein the main bodies 19 of the corresponding individual modules 11.2, 11.4-11.6 each additionally have a cable branch duct 24 which issues from the respective cable duct 23 and through which lines 16 routed through the cable duct 23 are routed onwards as far as the valve units 14. On the other hand, power lines (not shown) for heating elements are optionally routed through the cable duct 23. The cable ducts 23 of the individual modules are flush in the same way as the main ducts 20 for medium and likewise form a continuous duct.

As regards the individual valves or valve units 14, it is particularly important to note that these are of a modular construction according to the invention. They each have a main module 64, a dosing module 37 and a valve lift adjustment module 44, which are connected releasably to one another. The purpose of this modularity, and aspects thereof, are described in more detail below.

In the present case, the modular valves 14 are electrically operated (electro)magnet valves.

They each have a housing 25 forming a constituent part of the main module 64. As has already been indicated above, each valve unit or each valve 14 is connected releasably to the respective main body 19, for example by screws 26, which engage in a corresponding bore 27 of the valve unit 14.

As a central component of the (respective) valve 14, a coil carrier 28 designed in particular as a machined rotary part, and likewise forming a constituent part of the main module 64, is arranged inside the housing 25.

The coil carrier 28 is configured in one piece, preferably from metal, although it can in principle also comprise multiple parts.

The coil carrier 28 has an elongate and upright interior or cavity (central opening 30) which is continuous in the present case and which is enclosed by a respective wall of the coil carrier 28. In the present case, the interior 30 has a substantially hollow cylindrical design. Both the coil carrier 28 and also accordingly the interior 30 enclosed by it have several sub-portions.

The coil carrier 28 has an (upper) head portion 28a at one end, an adjoining (central) coil (carrier) portion 28b and, at its other end, a (lower) foot portion 28c adjoining the coil portion 28b. The respective portions 28a, 28b, 28c each enclose an assigned sub-portion 30a, 30c and 30c of the interior 30. In the area of the head portion 28a, the interior 30a has greater transverse dimensions than in the area of the coil portion 28b and/or than in the interior 30b surrounded by the coil portion.

The windings of one or more electrically operated coils 31 of a or the electromagnet of the valve 14 are wound on the outer face of the coil portion 28b. The electromagnet and the coil(s) 31 are accordingly likewise constituent parts of the main module 64. Moreover, an (electrical) connector attachment 70 (in the present case a plug) for connection to the power (supply) lines 16 leading to the coil 31, via which the coil 31 can be supplied with operating current.

In the interior 30 of the coil carrier 28, more precisely in the interior of the electromagnet or of the coil 31, a closure member or dosing member 32, for example a valve tappet, is arranged movably as a core or armature of the electromagnet. A closure means or a closure piece 34, in the present case a ball, is arranged on a lower shaft 33 of the closure member 32. The closure means 34 is assigned to the valve opening or dosing opening 15 of the valve 14. The valve opening 15 is situated centrally in the area of a funnel-shaped valve seat 36. In the closed position of the valve 14, the closure means 34 bears on seat surfaces, in particular on conical seat surfaces, of the valve seat 36.

The closure member 32 and the valve seat 36 are part of the dosing module 37. The dosing module 37 is secured releasably on the main module 64. In the present case, on the coil carrier 28 thereof. Specifically, it is connected to a terminal receiver 38 for the dosing module 37 of the foot portion 28c of the coil carrier 28 of the main module 64. However, this does not have to be the case. Securing to other parts of the main module 64 is also conceivable.

At the free end of the foot portion 28c of the coil carrier 28, the receiver 38 of the main module 64 for the dosing module 37 comprises an opening 39, which is formed by an end portion of the interior 30 of the coil carrier 28 and which is surrounded by a corresponding end portion of the foot portion 28c. The dosing module 37, in the present case specifically a nozzle part (nozzle) 40 having the valve seat 36, sits in the receiver 38 or the opening 39.

A securing part 41, for example a (sleeve) nut, is fixedly connected to the nozzle part 40 and is releasably connected to the main module 64.

Specifically to a (hollow cylindrical) receiver wall 42 of the receiver 38 of the coil carrier 28 or of the foot portion 28c thereof. In the present case, the receiver wall 42 for this purpose has a thread 43, which is screwed onto a corresponding mating thread of the securing part 41.

The valve lift adjustment module 44 is arranged in the area of the head portion 28a of the coil carrier 28 of the main module 64. This valve lift adjustment module 44 is connected to a terminal receiver 45 for the valve lift adjustment module 44 of the main module 64. Specifically to the head portion 28a of the coil carrier 28.

The receiver 45 of the main module 64 for the valve lift adjustment module 44 in this case comprises, at the free end of the head portion 28a of the coil carrier 28, an opening 46 which is formed by an end portion of the interior 30 of the coil carrier 28 and which is surrounded by a corresponding end portion of the head portion 28a. The valve lift adjustment module 44, in the present case an adjustment means 47 thereof, sits in the receiver 45 or the opening 46.

Specifically, the valve lift adjustment module 44 is screwed onto the receiver 45 of the head portion 28a of the coil carrier 28 or to a wall 48 of the receiver 45.

For this purpose, the adjustment means 47, for example an adjustment screw, is provided on the outside with a movement thread. A corresponding mating thread is arranged on the inside in the corresponding receiver wall 48 formed by the head portion 28a.

The adjustment means 47 has, at the end (at the upper end) thereof, a recess 61 or an attachment piece 61 on which a tool can be attached, for example a hexagon wrench. Rotations of the adjustment means 47 about the longitudinal centre axis thereof, effected by a worker, then cause an axial movement of the adjustment means 47 upwards or downwards, that is to say either in the direction of the end of the valve 14, at which end the dosing opening or the dosing unit 37 is arranged (dosing end), or in the corresponding opposite direction. With the aid of the adjustment means 47, an abutment part 49 of the valve lift adjustment module 44 connected thereto can in this way be moved axially in the interior 30 in the direction of the dosing end or in the opposite direction.

The abutment part 49 in this case forms an adjustable lift limiter for the closure member 32, which lift limiter limits the length of the maximum path by which the closure member 32 can be moved upwards in the interior 30 during an opening movement of the closure member 32.

The valve lift adjustment module 44 is designed in particular in such a way that, upon rotation of the adjustment means 47, there is no co-rotation of the abutment part 49. In other words, the rotation position of the abutment part 49 relative to the axial or to the longitudinal centre axis remains unchanged.

For this purpose, the adjustment means 47 is connected rotatably to the abutment part 49, wherein it is positively coupled thereto with respect to axial movements of the adjustment means 47. This positive coupling is obtained in the present case by the fact that the adjustment means 47 has a pin 50 which is connected in a rotationally fixed manner and in particular integrally thereto, which pin 50 is mounted rotatably in an elongate, in particular hollow cylindrical cavity or interior 51 of a pin receiver 52 that is connected in particular in a rotationally fixed manner to the abutment part 49. The pin 50 is secured against axial relative movement between pin 50 and pin receiver 52. In the present case, specifically by a form-fit connection 53 between pin 50 and pin receiver 52. Specifically, the pin 50 has at its free end an attachment 54 having a greater diameter than the cavity 51.

If, despite the rotatable mounting of the adjustment means 47 on the abutment part 49, rotational forces are still transmitted to the abutment part 49 upon rotation of the adjustment means 47, then a sealing ring 62 between the abutment part 49 and the inner face of the adjoining wall 48 of the head portion 28a of the coil carrier 28 prevents a rotation of the abutment part 49 by oppositely directed frictional forces.

As has already been mentioned above, the coil carrier 28 is a central component of the present valve 14. However, the modular construction thereof is also possible with coil carriers of other design.

The coil carrier 28 extends almost through the entire valve 14 (although this does not have to be the case either). Both the dosing unit 37 and the valve lift adjustment module 44 are secured on the coil carrier 28, and the closure member 32 is mounted movably therein.

The abutment part 49 of the valve lift adjustment unit 44 and the closure member 32 of the dosing unit 37 are positioned centrally in the interior 30 of the coil carrier 28 and in succession along a common (longitudinal centre) axis. The closure member 32 is guided in the axial direction in the interior 30 through a or the (hollow cylindrical) wall of the coil portion 28b of the coil carrier 28.

The interior portion 30a of the coil carrier 28 surrounded by the receiver 45 for the valve lift adjustment module 44, the interior portion 30b thereof surrounded by the coil portion 28b, and the interior portion 30c thereof surrounded by the receiver 38 for the dosing unit 37 are arranged along a common (longitudinal centre) axis.

The aforementioned measures ultimately lead to an excellent and durable orientation of the aforementioned components. In contrast to the prior art, this arises almost automatically from the design concept, since there is ultimately a self-centring or self-orientation of the aforementioned individual components during the assembly of the valve 14. This effectively prevents tolerance chains, as occur in particular when a multi-part valve housing is used, on the individual housing parts of which the aforementioned components are secured.

As regards the delivery of medium, the medium to be processed (for example glue or another fluid) is delivered to the valve 14 via a connector 55 for medium. The medium passes into the interior 30 of the glue valve 14 via a medium duct 56 arranged in the head portion 28a of the coil carrier 28 and leading from the outside of the head portion 28a as far as the interior 30.

It then enters the area of the interior 30 in which the abutment part 49 is located. For good flow of medium, the latter therefore has an in particular circumferential, inwardly directed depression or curve in the area in which the medium duct opens into the interior 30 or where said medium duct ends on the outside or outer contour.

During operation, the medium then flows from the upper area of the interior 30, or the interior sub-portion 30a delimited by the head portion 28a, downwards into the interior 30 along the closure member 32 in the direction of the dosing opening 15, specifically into a valve chamber 58 delimited by the nozzle part 40 or by the valve seat 36.

From the valve chamber 58, by suitable movement of the closure member 32, the medium can then be guided or caused to flow out of the valve in a manner controlled by release of the dispensing or dosing opening 15. For this purpose, when electrical current is suitably applied to the electromagnet to exert an opening force, the closure member 32 is moved in the direction of the abutment part 49 counter to a restoring force or closing force pressing the closure member 32 into the valve seat, such that the medium can flow out of the valve chamber 58.

The coil 31 of the electromagnet of the main module 64 surrounds the closure member 3 of the dosing module 37 at least in part. The closure member 32, preferably a magnetizable and generally metallic piston section 59 thereof, acts inside the coil 31 as a core of the electromagnet, as has already been indicated.

Figure 2:
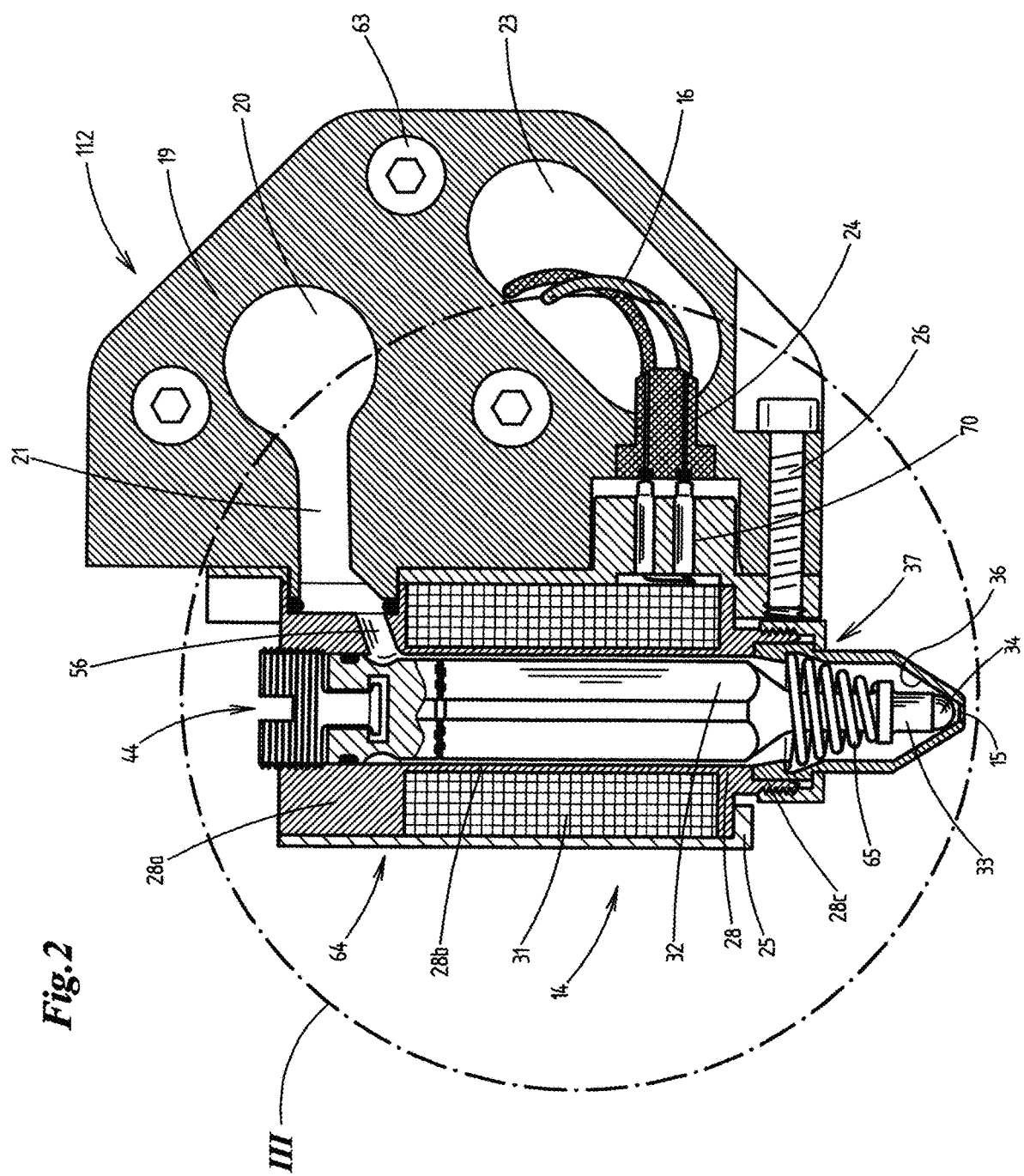
FIG. 2 shows a cross section along the section line II-II in FIG. 1.
Figure 3:
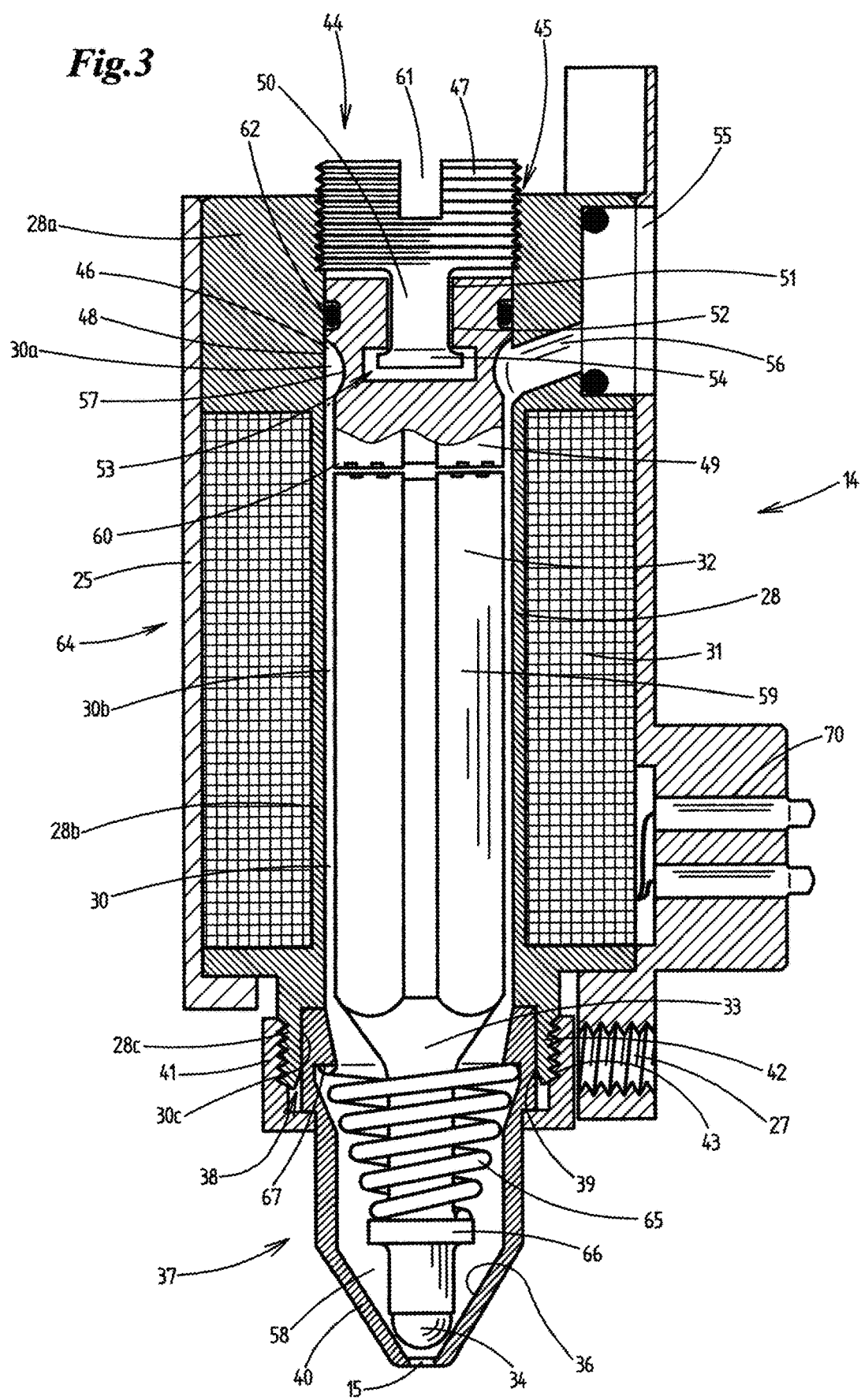
FIG. 3 shows the detail III from FIG. 2 in an enlarged view, namely an individual modular valve according to the invention in the assembled state.

The closure member 32 is preferably acted upon permanently in the closing direction by a closing force of a closing means or of a closing member. In the modular valve 14 shown in FIGS. 1-3, the closure member is a (restoring) spring 65.

The latter surrounds the closure member 32 in a (front) area inside the nozzle or the nozzle part. It bears at a (front) end on an annular, radial projection 66 of the nozzle 44 and bears with its other (rear end) on a (circumferential) supporting portion 67 of the nozzle 40.

Such a valve 14, in which the closing force is applied by a spring, is preferably used if the free-flowing medium has a very high viscosity. This is because particularly great closing forces are then needed.

However, there are also other cases in which it would be expedient to apply the closing force in another way. This is because the use of a spring for applying the force can also lead to considerable wear thereof, for example at high operating frequencies of the valve 14. It may then be expedient for the closing force to be applied by means of a permanent magnet.

Figure 4:
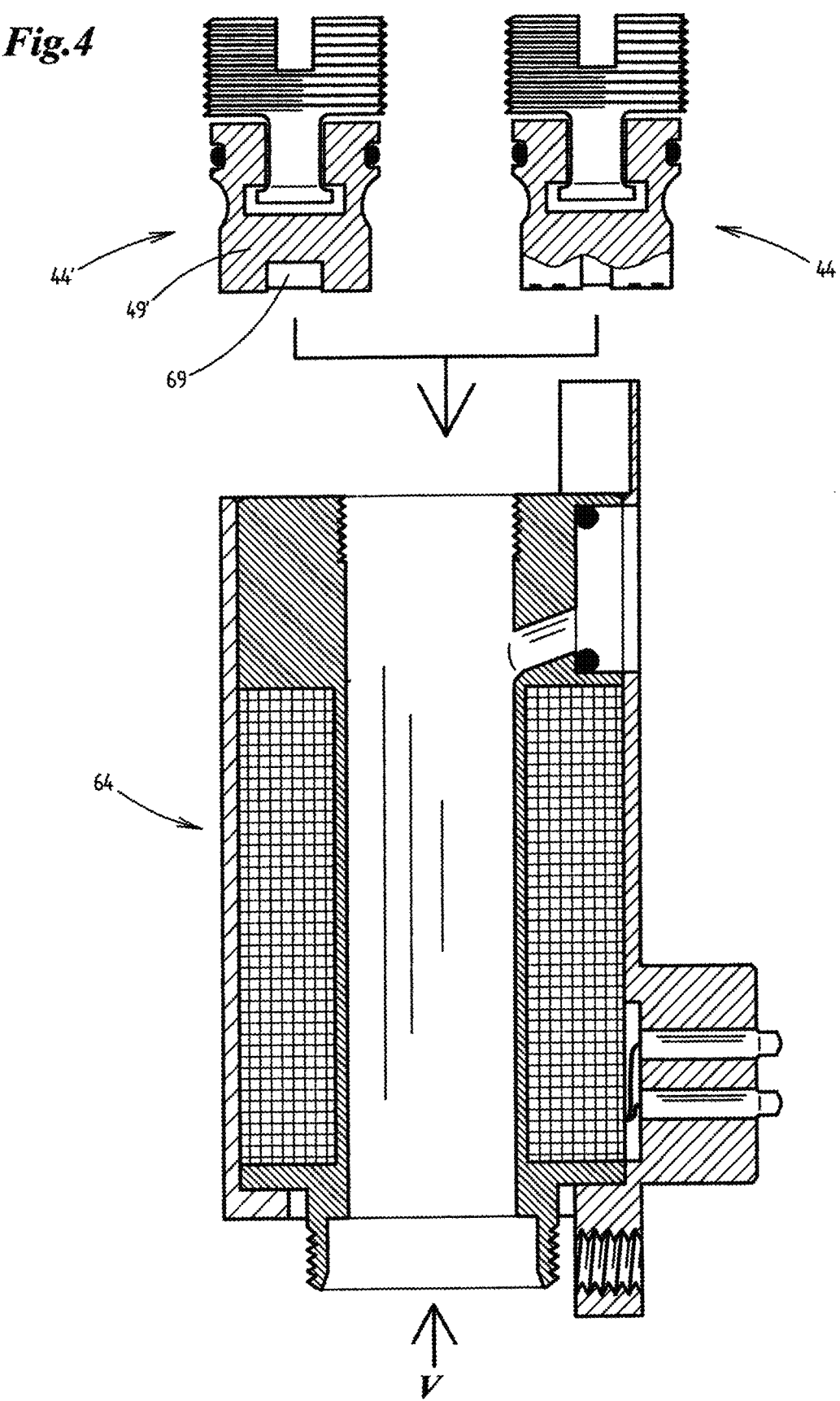
FIGS. 4 and 5 show the modular valve from FIG. 3 with different dosing modules and valve lift adjustment modules (unassembled).
Figure 5:
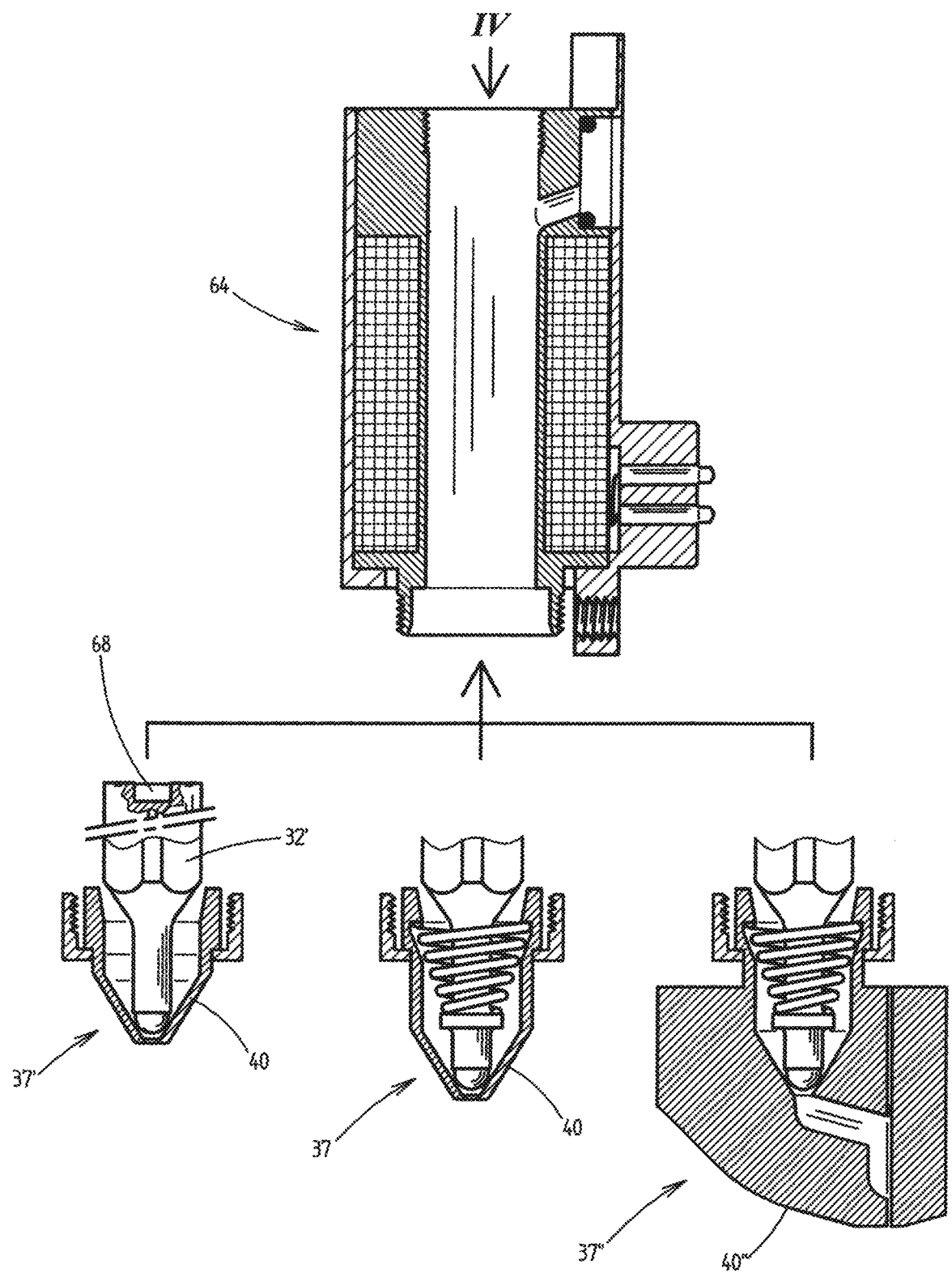

Particularly in such a case, but not exclusively, the modular construction of the valve 14 is very advantageous. By simply replacing the dosing module 37 with a (replacement) dosing module 37' and simply replacing the valve lift adjustment module 44 with a (replacement) valve lift adjustment module 44', while maintaining the main module 64, the valve 14 can be adapted functionally to another purpose (cf. FIGS. 4 and 5). A complete replacement of the entire valve 14 would therefore not be necessary.

Module replacement is easy on account of the releasable connection of dosing module 37 and valve lift adjustment module 44. Their respective screw connections to the main module 64 simply have to be undone and the modules then removed from the main module 64. The (replacement) dosing module 37' and the (replacement) valve lift adjustment module 44' are then connected to or plugged into the corresponding receivers 38 and 45, respectively, of the main module 64 and are finally secured on the main module 64 or screwed onto it.

In contrast to the dosing module 37, the dosing module 37' then has a closure member 32' which, in the area of its end facing towards the abutment part 49, has an individual magnet 68 (possibly also several). The individual magnet 68 is part of a permanent magnet that applies the closing force.

The other part of the permanent magnet is in the form of an individual magnet (or several of them) arranged on the abutment part 49' of the valve lift adjustment module 44', preferably at the free end 60 of the abutment part 49'. This serves to this extent also as a magnet holder. Its axial position relative to the closure member 32' or its axial distance from the closure member 32' can be adjusted/influenced in the manner already described above.

The two individual magnets 68, 69 are positioned in such a way that identical poles face towards each other, such that a permanent (repelling) force is exerted on the closure member 32', namely the closing force already mentioned above.

Moreover, it is also conceivable that the respective replacement dosing module has a different nozzle than the module secured on the valve 14. For example, the dosing modules 37 and 37' each have nozzles 40 with which droplet-shaped portions of medium can be generated. By contrast, in the case of the dosing module 37" (cf. FIG. 5), a so-called wide-slot nozzle 40" can be seen with which sheet-like or linear portions of medium can be generated.

LIST OF REFERENCE SIGNS 10 valve arrangement
11.1 individual module
11.2 individual module
11.3 individual module
11.4 individual module
11.5 individual module
11.6 individual module
11.7 individual module
12 medium portions/glue portions
13 blank
14 valve unit
15 dispensing/dosing opening
16 control lines
17 cable tube 18 medium tube
19 main body
20 medium main duct
21 medium branch duct
22 securing (outer) side
23 cable duct
24 cable branch duct
25 housing
26 screws
27 bore
28 coil carrier
28a head portion
28b coil portion
28c foot portion
30 interior
30a interior sub-portion
30b interior sub-portion
30c interior sub-portion
31 coil
32 closure member
32' closure member
33 shaft
34 closure means
36 valve seat
37 dosing module
37' dosing module
37" dosing module
38 receiver for dosing module
39 opening of the receiver
40 nozzles
40" nozzles
41 securing part
42 receiver wall
43 thread
44 valve lift adjustment module
44' valve lift adjustment module
45 receiver for lift adjustment module
46 opening of the receiver
47 adjustment means
48 receiver wall
49 abutment part
49' abutment part
50 pin
51 cavity
52 pin receiver
53 form-fit connection
54 attachment
55 medium connector
56 medium duct in head portion
57 annular duct
58 valve chamber
59 piston section
60 free end of abutment part
61 recess
62 sealing ring
63 screw holes
64 main module
65 spring
66 radial projection
67 supporting portion
68 individual magnet closure member
69 individual magnet abutment part
70 connection attachment

What is claimed is:

1. A modular valve for free-flowing media comprising:
a main module with a valve housing and an electromagnet;
a dosing module with a closure member which is movable by means of the electromagnet and which closes a dispensing opening of the dosing module in a closed position of the modular valve; and
a valve lift adjustment module for adjusting the valve lift, which valve lift adjustment module comprises an elongate abutment part which is arranged at least in part in a valve interior of the main module and is modifiable in its axial position in the valve interior, which abutment part limits the movement of the closure member in the direction of the valve lift adjustment module,
wherein the dosing module and the valve lift adjustment module are connected releasably to the main module in such a way that the dosing module and the valve lift adjustment module can each be replaced by another module of the same module type,
wherein the main module has, at one end, a terminal receiver for the dosing module, and, at an opposite other end, a terminal receiver for the valve lift adjustment module,
wherein the valve housing of the main module is open in the area of both of the terminal receivers of the main module,
wherein both of the terminal receivers of the main module each have a securing means which interacts with a matching securing means of the valve lift adjustment module or with a matching securing means of the dosing module and thereby effects a releasable securing of the valve lift adjustment module on the main module and a releasable securing of the dosing module on the main module,
wherein both of the terminal receivers of the main module, and also the valve interior of the valve housing of the main module in which the closure member is arranged movably, are designed in such a way and oriented relative to one another in such a way that the abutment part of the valve lift adjustment module and the closure member of the dosing module are positioned centrally in the valve interior and in succession along a common axis,
wherein the main module has a coil carrier which is made in one piece and on which coil carrier windings of a coil of the electromagnet are wound, and wherein the coil carrier surrounds a coil carrier interior in which at least one portion of the closure member is arranged and at least one portion of the abutment part is arranged,
wherein the dosing module and the valve lift adjustment module are secured on the coil carrier of the main module,
wherein the coil carrier has a coil portion onto which the coil is wound, wherein adjoining the coil portion on one side is a head portion with the terminal receiver for the valve lift adjustment module, to which terminal receiver the valve lift adjustment module is releasably connected by screwing, and wherein adjoining the coil portion on another opposite side is a foot portion with the terminal receiver for the dosing module, to which terminal receiver the dosing module is releasably connected by screwing, and
wherein the terminal receiver for the valve lift adjustment module is formed by an end portion of the coil carrier interior surrounded by the head portion, and by a wall of the head portion surrounding the end portion of the coil carrier interior surrounded by the head portion, and in that the terminal receiver for the dosing module is formed by the end portion of the coil carrier interior surrounded by the foot portion, and by a wall of the foot portion surrounding the end portion of the coil carrier interior surrounded by the foot portion.

2. The modular valve according to claim 1, wherein the dosing module and the valve lift adjustment module are replaceable by another dosing module and by another valve lift adjustment module, respectively, while the main module is retained.

3. The modular valve according to claim 1, wherein the common axis is a common longitudinal centre axis.

4. The modular valve according to claim 3, wherein the coil carrier is located in the valve housing of the main module, and the coil carrier is produced from a metallic material.

5. A replacement dosing module for a modular valve for free-flowing media,
wherein the replacement dosing module is releasably connected to a foot portion of a one-piece coil carrier of a main module of the modular valve at a position where a dosing module to be replaced of the modular valve has previously been removed,
wherein the replacement dosing module further comprises a securing means that interacts with a matching securing means of the main module of the modular valve, whereby the replacement dosing module is releasably secured on the main module,
wherein the dosing module to be replaced of the modular valve has a closure member that is held in the closed position by a permanent closing force applied by a permanent magnet which comprises at least one individual magnet arranged on an abutment part and at least one individual magnet arranged on the closure member,
wherein the at least one individual magnet arranged on the abutment part and the at least one individual magnet arranged on the closure member are positioned in such a way that identical poles face each other in order to apply the closing force,
wherein the replacement dosing module has another closure member which is movable by an electromagnet of the modular valve and which closes a dispensing opening of the replacement dosing module in a closed position of the modular valve, and
wherein the replacement dosing module has a spring for applying the permanent closing force to the another closure member of the replacement dosing module.

6. The replacement dosing module according to claim 5, wherein the dosing module of the modular valve has a nozzle with which individual droplet-shaped portions of medium are generated, and wherein the replacement dosing module has a nozzle with which linear or sheet-like portions of medium are generated.

7. The replacement dosing module according to claim 5, further comprising a closure member which is movable by means of an electromagnet and which closes a dispensing opening of the dosing module in a closed position of the modular valve, wherein the dosing module is connected releasably to the main module in such a way that the dosing module is replaceable by another module of the same module type.

8. A replacement valve lift adjustment module for a modular valve for free-flowing media,
wherein the replacement valve lift adjustment module is releasably connected to a head portion of a one-piece coil carrier of a main module of the modular valve at a position where a valve lift adjustment module to be replaced of the modular valve has previously been removed, and
wherein the replacement valve lift adjustment module comprises a securing means that interacts with a matching securing means of the main module of the modular valve, whereby the replacement valve lift adjustment module is releasably secured on the main module;
wherein the valve lift adjustment module to be replaced is for adjusting the valve lift;
wherein the valve lift adjustment module to be replaced has an abutment part having at least one individual magnet, which is part of a permanent magnet which applies a permanent closing force to a closure member of the modular valve and holds this closure member in a closed position;
wherein the permanent magnet also has at least one individual magnet arranged on the closure member, wherein the at least one individual magnet arranged on the abutment part and the at least one individual magnet arranged on the closure member are positioned in such a way that identical poles face each other in order to apply the closing force;
wherein the replacement valve lift adjustment module is releasably connected to the head portion of the coil carrier after removal of the valve lift adjustment module to be replaced;
wherein the replacement valve lift adjustment module comprises an elongate abutment part arranged at least in part in a valve interior of the main module and which is modifiable in its axial position in the valve interior, which elongate abutment part limits the movement of the closure member in the direction of the replacement valve lift adjustment module; and
wherein the elongate abutment part of the replacement valve lift adjustment module has no individual magnet.

9. The replacement valve lift adjustment module according to claim 8, wherein the valve lift adjustment module is releasably connected to the main module in such a way that the valve lift adjustment module is replaceable by another module of the same module type.

10. A valve module set comprising:
a) a modular valve comprising
a main module with a valve housing and an electromagnet;
a dosing module with a closure member which is movable by means of the electromagnet and which closes a dispensing opening of the dosing module in a closed position of the modular valve; and
a valve lift adjustment module for adjusting the valve lift, which valve lift adjustment module comprises an elongate abutment part which is arranged at least in part in a valve interior of the main module and is modifiable in its axial position in the valve interior, which abutment part limits the movement of the closure member in the direction of the valve lift adjustment module,
wherein the main module has, at one end, a terminal receiver for the dosing module, and, at an opposite other end, a terminal receiver for the valve lift adjustment module,
wherein the valve housing of the main module is open in the area of both of the terminal receivers of the main module,
wherein both of the terminal receivers of the main module each have a securing means which interacts with a matching securing means of the valve lift adjustment module or with a matching securing means of the dosing module and thereby effects a releasable securing of the valve lift adjustment module on the main module and a releasable securing of the dosing module on the main module, wherein the terminal receivers of the main module, and also the valve interior of the valve housing of the main module in which the closure member is arranged movably, are designed in such a way and oriented relative to one another in such a way that the abutment part of the valve lift adjustment module and the closure member of the dosing module are positioned centrally in the valve interior and in succession along a common axis, wherein the dosing module and the valve lift adjustment module are connected releasably to the main module in such a way that the modules and are replaceable by another module of the same module type, wherein the main module has a coil carrier that is made in one piece on which coil carrier windings of a coil of the electromagnet are wound, and wherein the coil carrier surrounds a coil carrier interior in which at least one portion of the closure member is arranged and at least one portion of the abutment part is arranged, wherein the dosing module and the valve lift adjustment module are secured on the coil carrier of the main module, wherein the coil carrier has a coil portion onto which the coil is wound, wherein adjoining the coil portion on one side is a head portion with the terminal receiver for the valve lift adjustment module, to which terminal receiver the valve lift adjustment module is releasably connected by screwing, and wherein adjoining the coil portion on another opposite side is a foot portion with the terminal receiver for the dosing module, to which terminal receiver the dosing module is releasably connected by screwing, and wherein the terminal receiver for the valve lift adjustment module is formed by an end portion of the coil carrier interior surrounded by the head portion, and by a wall of the head portion surrounding the end portion of the coil carrier interior surrounded by the head portion, and in that the terminal receiver for the dosing module is formed by the end portion of the coil carrier interior surrounded by the foot portion, and by a wall of the foot portion surrounding the end portion of the coil carrier interior surrounded by the foot portion;

b) a matching replacement dosing module, wherein the replacement dosing module is connectable releasably to the foot portion of the coil carrier of the main module of the modular valve after removal of the dosing module to be replaced of the modular valve; and c) a matching replacement valve lift adjustment module, wherein the replacement valve lift adjustment module is connectable releasably to the head portion of the coil carrier of the main module of the modular valve after removal of the valve lift adjustment module to be replaced of the modular valve.

11. The modular valve according to claim 1, wherein the coil carrier is inside the valve housing of the main module.

12. The valve module set according to claim 7, wherein the coil carrier is inside the valve housing of the main module.

* * * * *